United States Patent
Baun et al.

(10) Patent No.: US 8,690,442 B2
(45) Date of Patent: Apr. 8, 2014

(54) BEARING FOR A WIND TURBINE AND A CANISTER FOR A BEARING

(75) Inventors: Torben Friis Baun, Århus (DK); Jesper Lykkegaard Andersen, Hornslet (DK); Lasse Mygind Laursen, Knejsted (DK)

(73) Assignee: Vestas Wind Systems A/S, Aarhus N. (DK)

( * ) Notice: Subject to any disclaimer, the term of this patent is extended or adjusted under 35 U.S.C. 154(b) by 0 days.

(21) Appl. No.: 13/318,003

(22) PCT Filed: Apr. 23, 2010

(86) PCT No.: PCT/EP2010/055443
§ 371 (c)(1),
(2), (4) Date: Dec. 12, 2011

(87) PCT Pub. No.: WO2010/125000
PCT Pub. Date: Nov. 4, 2010

(65) Prior Publication Data
US 2012/0093450 A1   Apr. 19, 2012

Related U.S. Application Data

(60) Provisional application No. 61/173,770, filed on Apr. 29, 2009.

(30) Foreign Application Priority Data

Apr. 29, 2009   (DK) .................................. 2009 00551

(51) Int. Cl.
*F16C 1/24*   (2006.01)
*F16C 33/10*   (2006.01)
*F01M 1/04*   (2006.01)

(52) U.S. Cl.
USPC ........... 384/462; 384/385; 384/473; 384/606; 384/6.8; 384/18; 384/104.3

(58) Field of Classification Search
USPC ......... 384/400, 462, 471, 473–475, 592, 606, 384/385; 184/5–6, 11.2, 45.1, 68, 108; 416/174, 205
See application file for complete search history.

(56) References Cited

U.S. PATENT DOCUMENTS 818,787 A * 4/1906 Rader et al. .................. 384/592
2,858,175 A * 10/1958 Sutherland .................... 384/466
(Continued)

FOREIGN PATENT DOCUMENTS

EP   1 273 814   1/2003
GB   2 055 154   2/1981
(Continued)

OTHER PUBLICATIONS

Sanne H. Skovborg; 1st Technical Examination and Search Report issued in priority Denmark Application No. PA 2009 00551; Nov. 17, 2009; 5 pages; Denmark Patent and Trademark Office.
(Continued)

*Primary Examiner* — Marcus Charles
(74) *Attorney, Agent, or Firm* — Wood, Herron & Evans, L.L.P.

(57) ABSTRACT

A bearing for attaching a wind turbine blade to a wind turbine hub, includes a stationary ring, a movable ring which can rotate relative to the stationary ring, a grease lubrication structure, and a canister for collecting grease. The grease lubrication structure forms an outlet for releasing grease from a space between the stationary ring and the movable ring and the canister comprises an inner space with at least one inlet in releasable fluid communication with the outlet. The outlet and the inlet comprise cooperating coupling elements adapted for releasable snap-connection of the outlet to the inlet. Due to the snap-connection, the canister is easily removed and replaced in connection with maintenance of the wind turbine even though the space in the hub is typically very limited.

13 Claims, 6 Drawing Sheets

(56) References Cited

U.S. PATENT DOCUMENTS

| | | | |
|---|---|---|---|
| 3,195,965 A * | 7/1965 | Van Dorn | 384/475 |
| 3,637,270 A * | 1/1972 | Johnson | 384/471 |
| 4,697,832 A | 10/1987 | Dickirson | |
| 4,886,144 A * | 12/1989 | Wengeler | 184/108 |
| 4,941,757 A | 7/1990 | Hall | |
| 5,048,981 A * | 9/1991 | Ide | 384/607 |
| 5,246,087 A * | 9/1993 | Schipper | 184/5 |
| 5,441,120 A | 8/1995 | Dysart | |
| 5,620,060 A * | 4/1997 | Bialke | 184/104.1 |
| 5,636,460 A * | 6/1997 | Dretzka | 37/397 |
| 5,749,660 A * | 5/1998 | Dusserre-Telmon et al. | 384/475 |
| 6,991,378 B2 * | 1/2006 | Jacquemont et al. | 384/471 |
| 7,384,197 B2 * | 6/2008 | Plona | 384/473 |
| 2003/0048963 A1 | 3/2003 | Jacquemont et al. | |
| 2003/0133635 A1 * | 7/2003 | Nishibata et al. | 384/462 |

FOREIGN PATENT DOCUMENTS

| | | |
|---|---|---|
| JP | 2008-196676 | 8/2008 |
| JP | 2010-91067 | 4/2010 |
| WO | 2008/117518 | 10/2008 |

OTHER PUBLICATIONS

Arnold Schäfer; International Search Report and Written Opinion issued in priority International Application No. PCT/EP2010/055443; Oct. 14, 2010; 12 pages; European Patent Office.

Arnold Schäfer; International Preliminary Report on Patentability issued in priority International Application No. PCT/EP2010/055443; May 11, 2011; 10 pages; European Patent Office.

* cited by examiner

BEARING FOR A WIND TURBINE AND A CANISTER FOR A BEARING

CROSS REFERENCE TO RELATED APPLICATIONS

This application is a National Stage of International Application No. PCT/EP2010/055443, filed Apr. 23, 2010, which claims the benefit of U.S. Provisional Application No. 61/173,770, filed Apr. 29, 2009 and DK Application No. PA 2009 00551, each of the applications being incorporated by reference herein in their entirety.

The invention relates to a bearing for attaching a wind turbine blade to a wind turbine hub, the bearing comprising a stationary ring, a movable ring which can rotate relative to the stationary ring, and a canister for collecting grease, the bearing forming an outlet for releasing grease from a space between the stationary ring and the movable ring and the canister comprising an inner space with at least one inlet in releasable fluid communication with the outlet. The invention further relates to a grease collection canister for a bearing.

BACKGROUND OF THE INVENTION

In traditional wind turbines, the blades, i.e. often three blades in total, are attached to a hub which forms one of the two free ends of the drive shaft from which the converted energy is released, for example, by rotation of an electrical generator.

Bearings arranged between the hub and blades facilitate rotation and thus control of the blade angle relative to the hub. This allows control of the conversion ratio between the wind energy and the energy of the rotating drive shaft. The blades may, for example, be pitched completely out of the wind so that no conversion takes place, e.g., if the wind turbine is stopped for maintenance or due to strong winds.

In general, bearings for the blades are difficult to access and typically, proper maintenance and lubrication is important for the reliability of the wind turbine.

Means for improving the lubrication of bearings are known in various bearings. GB 2055154 discloses a container which can be contracted in response to increasing temperatures whereby grease is injected into a cavity via lubrication channels.

EP 1273814 discloses a bearing for a wind turbine where different lubrication channels are connected to containers for transporting grease away from a cavity of the bearing. In practice, it has been found difficult to handle such containers in the very narrow space in the hub of a wind turbine, and in particular, it has been found difficult and time consuming to replace containers which are filled up with grease.

DESCRIPTION OF THE INVENTION

It is an object of embodiments of the invention to improve bearings for wind turbines, and to facilitate an easier handling of containers for waste grease from the bearing.

Accordingly, the invention, in a first aspect, provides a bearing for attaching a wind turbine blade to a wind turbine hub, wherein the outlet and the inlet comprises cooperating coupling elements by which the canister can be fixed to one of the rings.

Herein, the canister is considered being fixed to the ring by the coupling elements when no additional attachment is necessary for the canister to cooperate with the rings.

Due to the use of the couplings for fixing the canister to one of the rings, handling of the canisters are highly improved and even though the space is limited in the hub, it has been found relatively easy to replace canisters which have been filled with grease since the canisters are fixed already when the coupling elements are joined.

In particular, the coupling elements may be adapted to fix the canister to the outlet in such a manner that a canister cannot be moved relative to an outlet to which it is attached. For this purpose, the inlet and outlet may form a rigid connection preventing any movement of the canister relative to the outlet and thus relative to the ring to which it is connected. In one example, the inlet on the canister may form a rigid tubular stub extending outwards from an outer surface of the sidewall, e.g., perpendicular to or radial outwards from the outer surface.

The coupling elements may particularly be adapted for releasable snap-connection of the outlet to the inlet. Due to the snap-connection, handling of the canisters may be further improved in particular taking the limited space in the hub into consideration.

The snap coupling design of the invention facilitates joining of the outlet and inlet without use of separate screws, bolts, or similar traditional attachment means for fastening, and this can greatly increase assembly and installation efficiency to save assembly time and the cost of components. The snap coupling may, for example, be of the commercially available kind where a spring force presses a locking structure towards a locked position wherein the two coupling elements are fixed. By movement of a release structure against the spring force, the locking element may be moved to an unlocked position wherein the coupling elements become separable. Such coupling elements are available, for example, from Dunlop Hiflex.

The bearing could be of any commercially available kind, e.g., a roller bearing, ball bearing, needle bearing or any similar kind of bearing comprising a stationary ring and a ring which can rotate relative to the stationary ring.

In addition to the outlet for releasing grease from the space and the canister having an inlet being connectable directly to the outlet, the lubrication structure may further comprise an intake connected to a source of grease for discharging grease into a space between the stationary ring and the movable ring.

The cooperating coupling elements adapted for releasable snap-connection of the outlet to the intake may include any kind of commercially available snap coupling structure, e.g., including cooperating male and female manifolds adapted for a push-to-connect action where the male manifold is received in a recess in the female manifold. In such a structure, the two coupling elements may lock to each other by friction, or the coupling elements may include anchor structures, e.g., including one or more latch hooks on one coupling element which engage in a recesses or projection on the matching coupling element etc. Such structures are widely used, for example, for connecting hoses and tubes of various kinds. The coupling elements may alternatively include cooperating manifolds forming plane abutment shoulders adapted to abut each other in a tight manner.

In this case, the coupling elements could be pressed towards each other by use of a pipe unit, e.g., a threaded pipe union of the kind known, for example, for connecting water pipes etc.

To prevent leakage of grease, both coupling elements may be self-sealing or, in case of male/female coupling elements, at least one of the elements may comprise an O-ring or similar sealing means.

Advantageously, one canister may receive grease from several individual outlets. Accordingly, each canister may comprise several inlets, e.g., two or three inlets. Each inlet may form individual stubs extending rigidly outwards from the outer surface of the sidewall.

The coupling elements of the outlet and of the canister may be adapted for separation by triggering a release structure provided on one of the coupling elements, e.g., on the coupling element of the canister. The release structure may, for example, be adapted to allow separation of the inlet from the outlet by movement of the release structure in a direction from the canister towards the outlet. The release structure could, for example, be formed as a sleeve arranged about the coupling element of the canister.

The canister may comprise a triggering structure for collective triggering of the release structure on all coupling elements on the canister, e.g., adapted to trigger all release structures simultaneously.

The canister may form an oblong sidewall extending between an opening and a bottom. The canister comprises a closure which can be attached to the opening for closing the opening. This closure may form a structure which allows air to be released from the canister as grease is received from the outlet. This ventilation structure may comprise an opening into the inner space, e.g., an opening formed in the centre of a relatively plane panel formed by the closure.

To prevent grease from being spilled out of the canister via the opening in the closure, the ventilation structure may further comprise a tube extending from the opening inwards into the inner space. In one embodiment, the tube has the shape of a frustum of a cone, i.e. it forms a conduit with a cross-section which constricts from a first area at the opening in the closure to a second and smaller area at a free end of the tube where the tube terminates inside the canister.

If the canisters are arranged relative to the hub of the wind turbine in such a way that the openings in the closures of the canisters face towards that axis of rotation about which the wind turbine hub rotates, i.e. when the shaft rotates, then the grease will be forced to the bottom of the canisters under influence of the forces created by the rotation of the hub. Preferably, the canisters are arranged in such a manner, that the tubes which extend from the opening and into the canisters extend in a radial direction relative to the axis of rotation of the hub. If rotation of the wind turbine hub stops, the grease may spread from the bottom portion of the canisters towards the inner surface of the closure, and in this case, the radial tube will prevent or at least reduce the amount of grease which is spilled from the canisters.

To facilitate the above mentioned orientation of the canisters relative to the axis of rotation of the hub, the coupling elements on the canister may advantageously be formed in the sidewall of the canister. If one canister has more than one coupling element belonging to more than one inlet, the inlets and/or the coupling elements may advantageously be arranged along a line extending axially relative to the canister, i.e. from the bottom towards the closure.

To provide good fixation of the canisters to one of the rings of the bearing, the canisters may comprise abutment structures forming legs on which the canisters can be supported on the ring, when the canisters are attached to the outlets.

The abutment structures thereby form contact between the sidewall and one of the stationary and movable rings.

In a second aspect, the invention provides a canister for a bearing, the canister comprising an inner space in fluid communication with an inlet, and at least one coupling element for releasable snap-connection of the canister to a corresponding coupling element of a grease outlet of the bearing.

The canister may include any of the features mentioned with respect to the canister as described above in connection with the first aspect of the invention.

The invention may further provide a method of collecting grease from a bearing, in particular in a wind turbine. According to this method, a bearing and/or a canister as described above is applied in the wind turbine, and the grease is guided via the outlet and inlet from the space between two rings of the bearing and into the canister.

BRIEF DESCRIPTION OF DRAWINGS

Embodiments of the invention will be described in further details with reference to the drawings in which.

DETAILED DESCRIPTION OF EMBODIMENTS OF THE INVENTION

Further scope of applicability of the present invention will become apparent from the following detailed description and specific examples. However, it should be understood that the detailed description and specific examples, while indicating preferred embodiments of the invention, are given by way of illustration only, since various changes and modifications within the spirit and scope of the invention will become apparent to those skilled in the art from this detailed description.

Figure 1A:
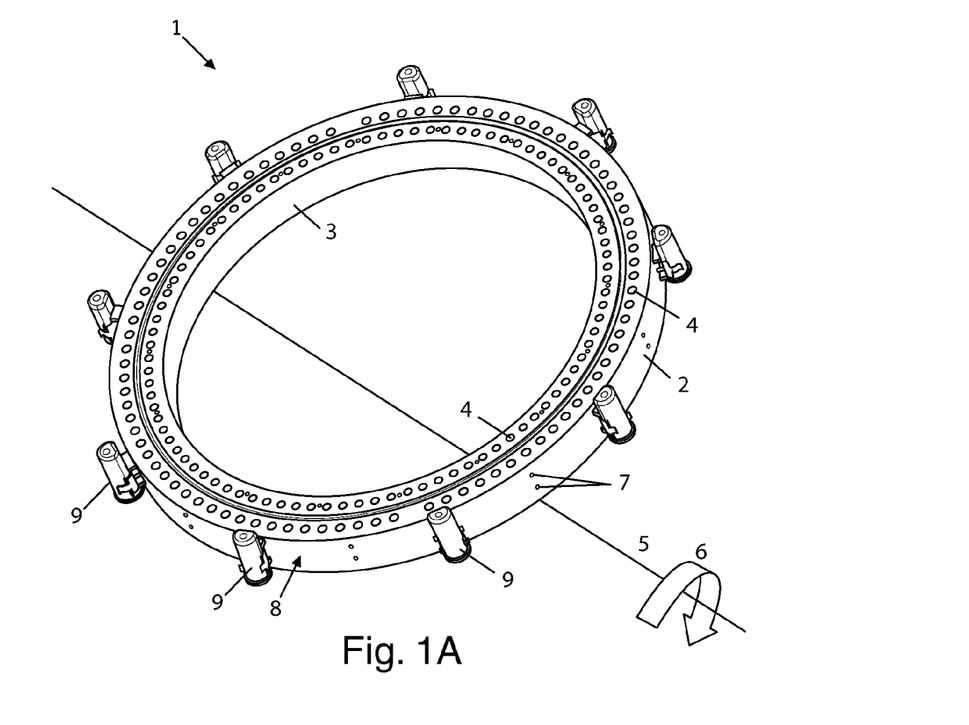
FIGS. 1a and 1b illustrate a bearing according to the invention.
Figure 1B:
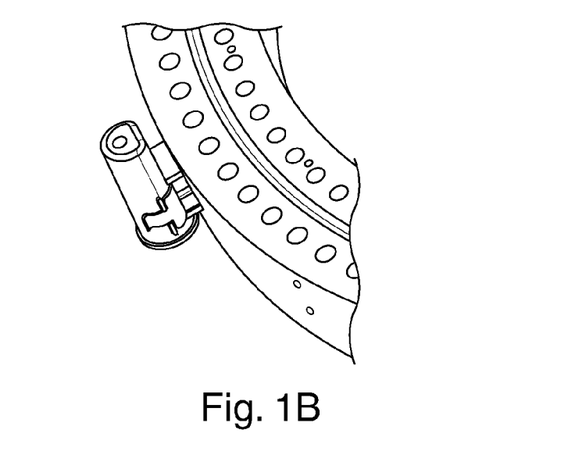

FIGS. 1a and 1b illustrate a bearing 1 for attaching a wind turbine blade to a wind turbine hub. The bearing comprises two rings, one of which is a stationary ring 2, and one of which is a movable ring 3. The movable ring 3 rotates relative to the stationary ring 2, and both rings comprise a plurality of bores 4 for attaching the stationary ring to the hub of the wind turbine and the movable ring 3 to the blade for the wind turbine. By use of the bearing, the blade can rotate around a longitudinal axis of the blade so that the blade can transfer a variable degree of the energy presented by the wind to the drive shaft.

For lubricating the bearing, grease is discharged into a space between the stationary ring 2 and the movable ring 3 via pairs of intakes 7. The grease is rejected from this space via corresponding outlets arranged in the peripheral outer surface 8 of the stationary ring 2.

For collecting the grease and thus for avoiding pollution of the hub space with waste grease, the bearing comprises a plurality of canisters 9.

The outlets are connected directly to the illustrated canisters 9 so that grease from this space can be discharged directly into the canisters 9. In FIG. 1, the outlets are covered by the canisters 9 and they can therefore not be seen. The outlets, however, corresponds essentially to the intakes 7, and in the following, they will be referred to correspondingly as outlets 7.

Figure 2:
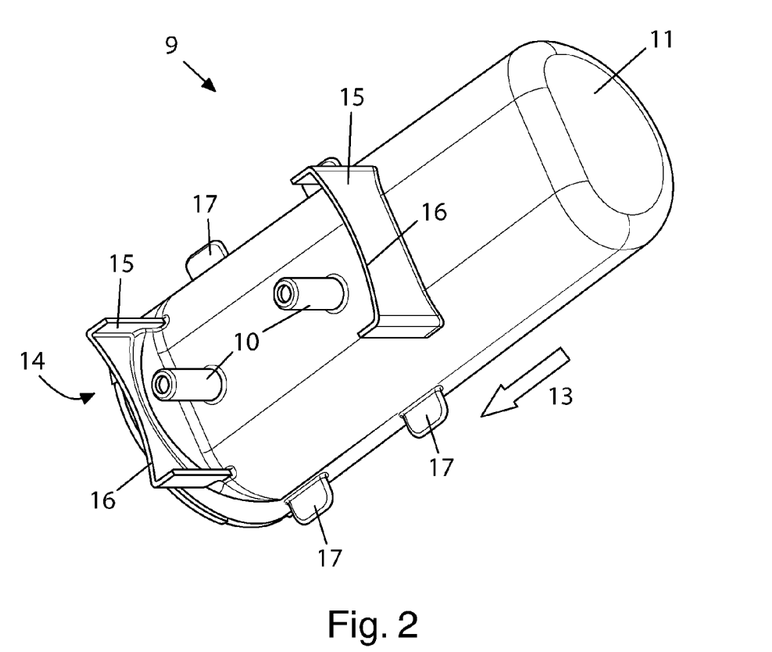
FIGS. 2 and 3 illustrate a canister according to the invention.
Figure 3:
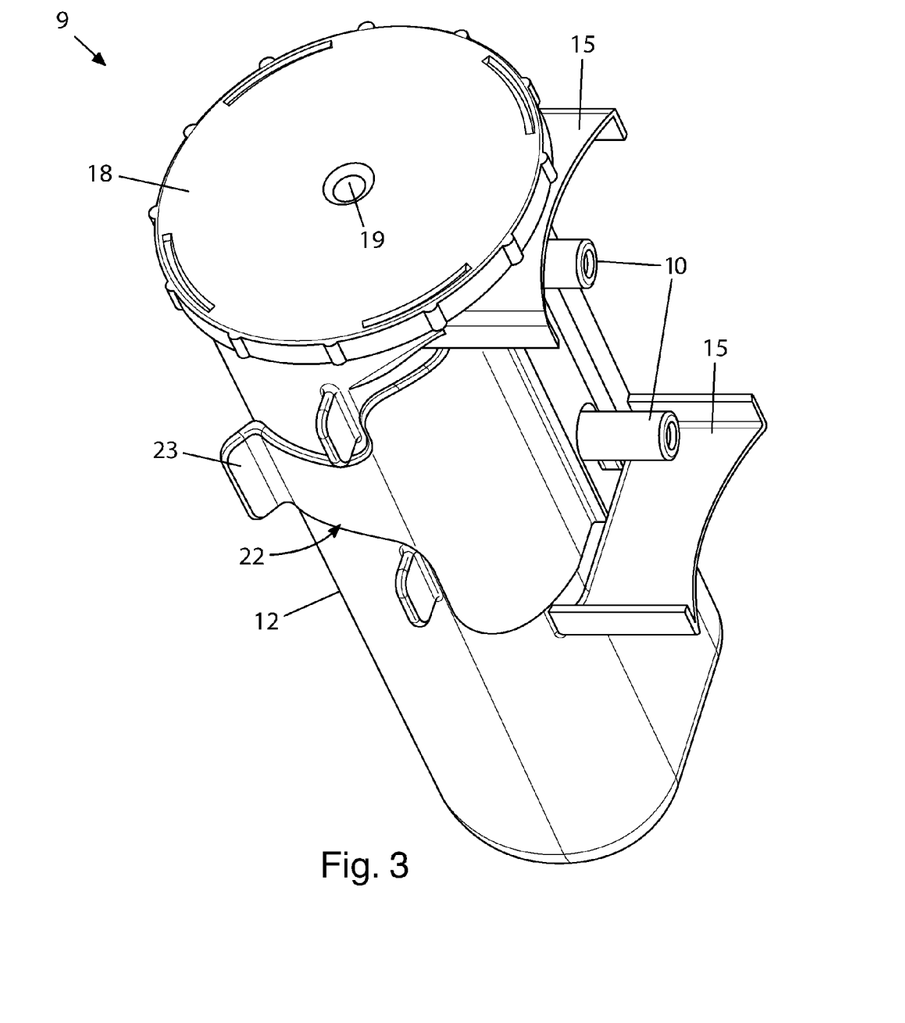

The canister 9 is illustrated more clearly in FIGS. 2 and 3. The canister 9 has two inlets 10 which are connectable directly to the outlets 7 so that waste grease can be conducted from the space through the outlets 7 and the inlets 10 into an inner space inside the canister 9.

Figure 3A:
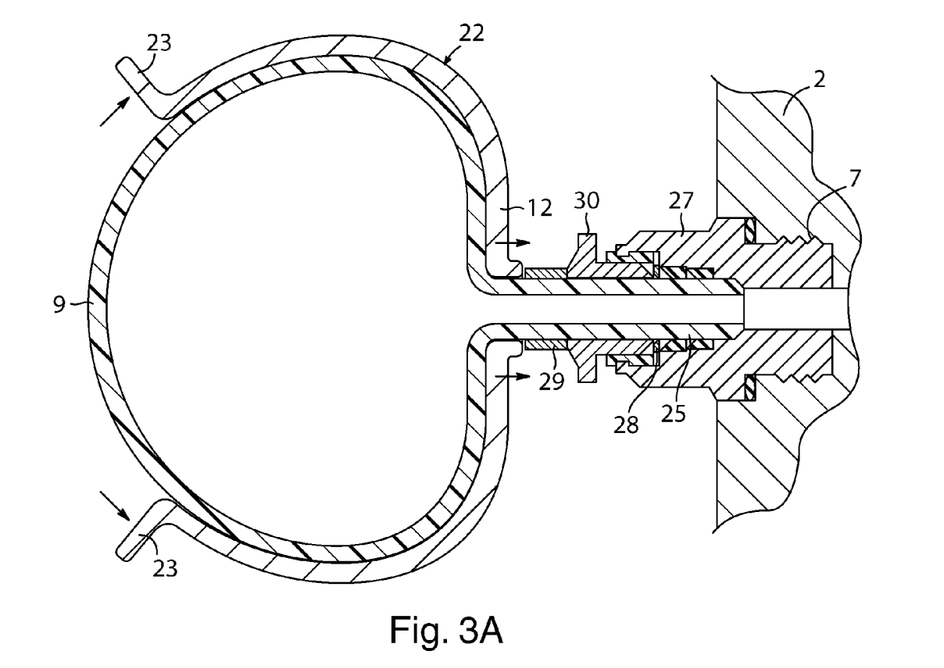
FIGS. 3A and 3B illustrate attachment and removal of the canister from the bearing according to an embodiment of the invention.
Figure 3B:
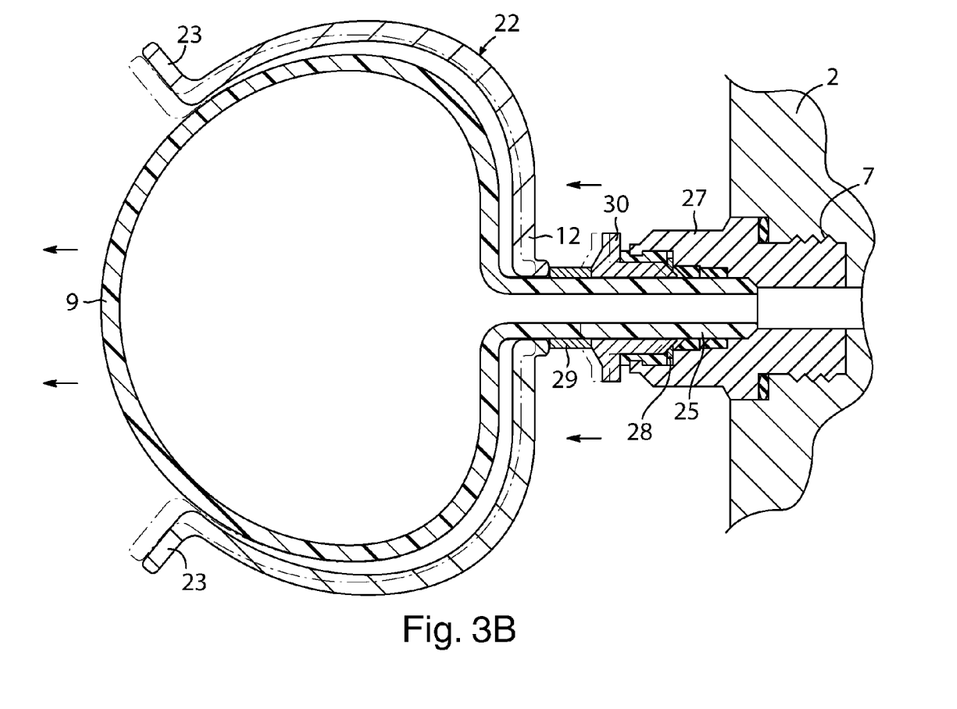

The outlets 7 and the inlets 10 are fitted with matching coupling elements with snap connection feature of the kind available under item no 7500112104 12¼" METAL STRAIGHT PUSH-IN, from the company Dunlop Hiflex. For example, and as illustrated in FIGS. 3A and 3B, in one embodiment the canister 9 includes an inlet 10 configured as a tubular stud 25 extending from a sidewall 12 thereof, and the stationary ring 2 includes a fitting 27 coupled to outlet 7. As is known by those of ordinary skill in the art, the fitting 27 is configured to receive the tubular stud 25 and includes an internal clamping ring 28 that clamps onto the stud 25 so as to secure the canister 9 to the stationary ring 2. The fitting 27 is further configured to selectively release the tubular stud 25 therefrom. In this regard, a release structure is provided on the tubular stud 25 and cooperates with the fitting 27 to release the canister 9 from the stationary ring 2. In one embodiment, for example, the release structure may be formed as a sleeve 29 arranged about the stud 25 and movable relative to the tubular stud 25 in a direction from the canister 9 toward the fitting 27 in the outlet 7 of the stationary ring 2. More particularly, the fitting 27 may include a movable collet 30 configured to cooperate with the clamping ring 28 in the fitting 27 to release the tubular stud 25 from the clamping ring 28 when the collet 30 is depressed. When the sleeve 29 is moved toward the outlet 7 of the stationary ring 2, it engages the collet 30 of the fitting 27 to release the clamping ring 28 and allow the canister 9 to be moved away from the stationary ring 2.

The canister is formed with a bottom 11, a sidewall 12 extending in the direction indicated by the arrow 13 from the bottom 11 towards an opening 14. The opening 14 is closed by a releasable closure 18 illustrated in FIGS. 4 and 5.

The sidewall of the canister forms an abutment structure 15 which provides contact between the sidewall 12 and the peripheral outer surface 8 of the stationary ring 2 when the coupling elements of the inlets 10 and outlet 7 are joined. To support the canister 9 against the surface 8, the abutment structure 15 forms a curved abutment face 16.

The canister 9 further comprises projections 17 which cooperate with a triggering structure which will be discussed in further details with reference to FIGS. 6 and 7.

Referring now again to FIGS. 1a and 1b, the drive shaft of the wind turbine rotates the hub and thereby all blades—i.e. typically three blades, around an axis or rotation depicted by the line 5. Each blade and each bearing 1 is therefore driven with a common rotational speed around the axis depicted by line 5 in the direction indicated by the arrow 6.

During rotation of the bearing in the direction indicated by the arrow 6, grease in the canisters 9 will be forced to the bottom 11 of the canisters 9.

The outlets 7 and the inlets 10 comprises cooperating coupling elements which joins the inlets 10 and outlets 7 in a fixed manner so that the canister 9 is held in a fixed position relative to the stationary ring 2. The coupling elements are adapted for releasable snap-connection of the outlet to the inlet. To provide the snap-connection, a bushing which slides on an outer surface of the couplings of the inlets 10 either releases radial movable locking pawls from engaging into the couplings of the outlets 7 or locks the pawls into engagement with the couplings of the outlets 7 depending on the axial position of the bushings on the inlets 7. The coupling elements are provided in such a manner that a movement of the bushing in a direction away from the canister towards the outlets 7 releases the locking paws from the engagement so that the inlets 10 and outlets 7 can be separated and the canister can be removed from the remaining part of the bearing.

FIG. 3 illustrates the canister 9 with a triggering structure which is described in further detail with reference to FIGS. 6 and 7.

Figure 4:
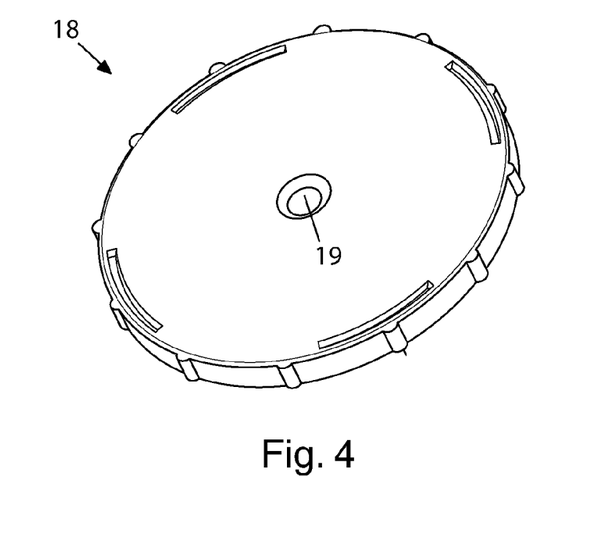
FIGS. 4 and 5 illustrate a closure for a canister according to the invention.
Figure 5:
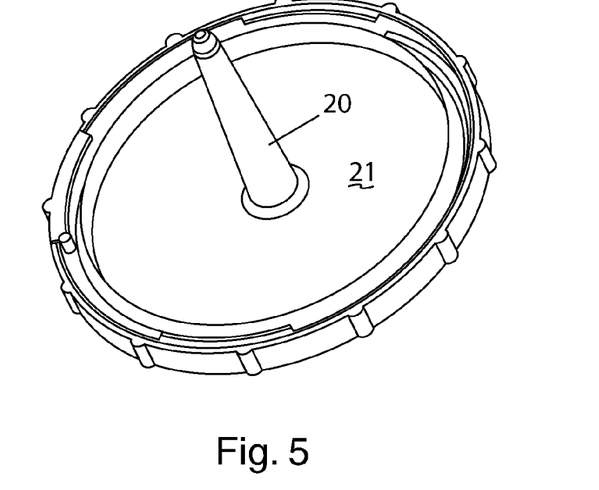

FIGS. 4-5 illustrate the releasable closure 18 with an opening 19 and a tube 20 which extends from an inner surface 21 of the closure 18 and inwards into the inner space of the canister 9.

When the canister forms part of the bearing as illustrated in FIG. 1, the tube 20 extends in a radial direction relative to the axis of rotation, c.f. numeral 5 in FIG. 1, i.e. opposite the direction of rotation. The opening 19 and tube 20 form a ventilation structure allowing release of air from the inner space of the canister 9 when the canister receives grease from the space between the two rings of the bearing. Due to the outward force associated with the rotation around the axis 5 (cf. FIG. 1) of rotation, the grease in the canister will be forced towards the bottom of the canister in a direction away from the opening 19 and away from the tube 20. When rotation is stopped, the gravitational force, which, on at least some of the canisters, acts in the direction from the bottom 11 towards the releasable closure 18, will tend to force the grease towards the opening 19 of the canister 9. In this case, the tube 20 will effectively prevent or at least reduce the amount of grease which is spilled out of the canister 9 via the opening 19.

Figure 6:
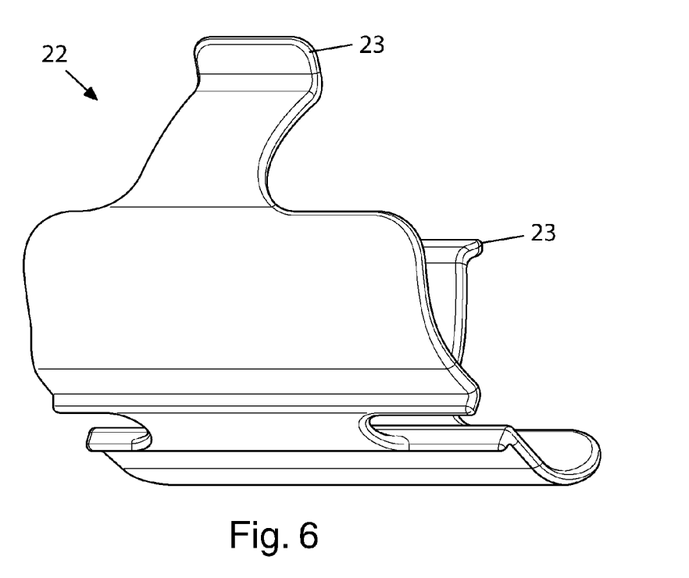
FIGS. 6 and 7 illustrate a triggering structure for release of the inlet from the outlet.
Figure 7:
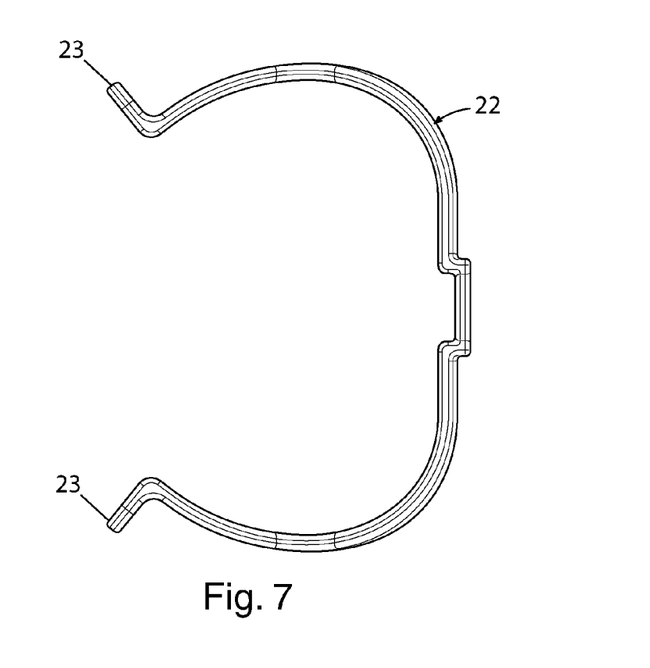

FIGS. 6-7 illustrate a triggering structure 22 which can be arranged circumferentially around the sidewall 12 of the canister. The triggering structure 22 is movable relative to the sidewall 12 and relative to the coupling elements for collective triggering of the release structure on all coupling elements on the canister 9. This release is carried out by movement of the triggering structure 22 in a direction away from the sidewall 12 of the canister towards the outlet 7 by finger-pressure on the outwards end portions 23. More particularly, and as illustrated in FIGS. 3A and 3B, finger pressure on the end portions 23 of triggering structure 22 results in a corresponding movement of the sleeve 29 on each of the tubular studs 25 of the canister 9 in a direction from the canister toward the outlets 7 of the stationary ring 2. As described above, movement of the sleeves 29 in this direction causes an engagement with the collet 30 of the fitting 27 so as to release the clamping ring 28 of the fitting 27 from the tubular studs 25 and allow the canister 9 to be moved away from the stationary ring 2.

The invention claimed is:

1. A bearing for attaching a wind turbine blade to a wind turbine hub, the bearing comprising a stationary ring, a movable ring which can rotate relative to the stationary ring, and a canister for collecting grease, the bearing comprising an outlet for releasing grease from a space between the stationary ring and the movable ring, and the canister comprising at least one inlet for receiving the grease from the outlet, wherein the outlet and the inlet comprises cooperating coupling elements by which the canister can be fixed to one of the rings, wherein the coupling elements of the outlet and of the canister are adapted for separation by movement of a release structure in a direction from the canister towards the outlet.

2. The bearing according to claim 1, wherein the coupling elements are adapted for releasable snap-connection of the outlet to the inlet.

3. The bearing according to claim 2, comprising more than one outlet each comprising a coupling element for releasable snap-connection to individual coupling elements on the canister.

4. The bearing according to claim 1, wherein the coupling elements of the outlet and of the canister are adapted for separation by triggering a release structure provided on the coupling element on the canister.

5. The bearing according to claim 1, wherein the canister comprises a triggering structure for collective triggering of the release structure on all coupling elements on the canister.

6. The bearing according to claim 1, wherein the canister comprises a bottom, a sidewall extending upwards from the bottom towards an opening, and a releasable closure for closing the opening.

7. The bearing according to claim 6, wherein a ventilation structure forms part of the releasable closure.

8. The bearing according to claim 7, wherein the ventilation structure forms an opening in the releasable closure and a tube extending from the opening inwards into the inner space.

9. The bearing according to claim 8, wherein the tube forms a truncated cone narrowing down in the direction inwards into the inner space in the canister.

10. The bearing according to claim 6, wherein the coupling elements on the canister are formed in the sidewall.

11. The bearing according to claim 1, wherein the canister comprises a ventilation structure forming an opening into an inner space in the canister allowing release of air from the inner space of the canister when the canister receives grease.

12. The bearing according to claim 11, wherein the opening faces towards a direction of movement of the canisters caused by rotation of a drive shaft of the wind turbine.

13. The bearing according to claim 1, further comprising an abutment structure providing contact between the sidewall and one of the stationary and movable rings.

* * * * *